United States Patent
Mateer

(10) Patent No.: US 12,349,669 B2
(45) Date of Patent: Jul. 8, 2025

(54) INSECT CONTROL DEVICE INCLUDING ALIGNMENT AND SPACING MEMBERS FOR SUPPORTING A SUBSTRATE

(71) Applicant: Woodstream Corporation, Lancaster, PA (US)

(72) Inventor: Chad Mateer, Manheim, PA (US)

(73) Assignee: Woodstream Corporation, Lancaster, PA (US)

( * ) Notice: Subject to any disclaimer, the term of this patent is extended or adjusted under 35 U.S.C. 154(b) by 286 days.

(21) Appl. No.: 18/073,913

(22) Filed: Dec. 2, 2022

(65) Prior Publication Data

US 2023/0094244 A1 Mar. 30, 2023

Related U.S. Application Data

(63) Continuation of application No. 16/583,329, filed on Sep. 26, 2019, now Pat. No. 11,523,601.

(60) Provisional application No. 62/751,154, filed on Oct. 26, 2018.

(51) Int. Cl.
  *A01M 1/20* (2006.01)
  *A01N 57/12* (2006.01)

(52) U.S. Cl.
  CPC ........... *A01M 1/2055* (2013.01); *A01N 57/12* (2013.01)

(58) Field of Classification Search
  CPC .... A01M 1/20; A01M 1/2022; A01M 1/2027; A01M 1/2055; A01N 57/12
  USPC ........................................................ 43/131
  See application file for complete search history.

(56) References Cited

U.S. PATENT DOCUMENTS

| | | | |
|---|---|---|---|
| 2,748,765 | A | 12/1950 | Scholl |
| 3,659,373 | A | 5/1972 | Daeninckx |
| 3,790,081 | A | 2/1974 | Thornton et al. |
| 3,807,082 | A | 4/1974 | Hautmann et al. |
| 3,814,061 | A | 6/1974 | Aries et al. |
| 3,864,867 | A | 2/1975 | Dry |
| 3,876,762 | A | 4/1975 | Rabussier et al. |
| 4,161,283 | A | 7/1979 | Hyman |
| D262,138 | S | * 12/1981 | Bousgarbies ................ D23/366 |

(Continued)

FOREIGN PATENT DOCUMENTS

WO  9519305 A1  7/1995

OTHER PUBLICATIONS

Nuvan Prostrips; Nuvan ProStrips Large Size (65 gram × 3 pack), 2 pages, downloaded Dec. 4, 2019.

(Continued)

*Primary Examiner* — Brady W Frazier
(74) *Attorney, Agent, or Firm* — Barley Snyder

(57) ABSTRACT

An insect control device is provided for controlling insects in a household garbage receptacle used in an outdoor or semi-outdoor environment. The insect control device includes an outer housing with gas-flow apertures therein, a quantity of a gas-releasing insect poison contained within the housing, and an adhesive attaching element for securing the housing to an inner surface of a closed or lidded household garbage receptacle. Gas released by the insect poison flows out of the housing through the gas-flow apertures to permeate the air inside the enclosed garbage containment area and kill insects therein while the adhesive element keeps the device securely in place within the garbage receptacle and out of the reach of children and pets during both use and emptying of the receptacle.

18 Claims, 8 Drawing Sheets

(56) References Cited

U.S. PATENT DOCUMENTS

| | | | |
|---|---|---|---|
| 5,071,704 A | 12/1991 | Ghodsian | |
| 5,174,462 A * | 12/1992 | Hames | B65F 7/00 |
| | | | 220/908 |
| 5,280,684 A | 1/1994 | Filonczuk | |
| 5,588,250 A * | 12/1996 | Chiba | A01M 1/02 |
| | | | 43/115 |
| 5,685,894 A * | 11/1997 | Bowerman | A47L 9/325 |
| | | | 55/501 |
| 5,988,520 A | 11/1999 | Bitner | |
| 6,058,646 A * | 5/2000 | Bishoff | A01M 1/026 |
| | | | 43/132.1 |
| 6,163,889 A * | 12/2000 | Tate | A63B 57/353 |
| | | | 2/209.13 |
| 8,657,139 B1 | 2/2014 | Bodine | |
| 11,523,601 B2 | 12/2022 | Mateer | |
| 2004/0006320 A1* | 1/2004 | Buglino | A61F 5/448 |
| | | | 604/344 |
| 2009/0158636 A1* | 6/2009 | Rosario | A01M 3/022 |
| | | | 43/136 |
| 2014/0022880 A1* | 1/2014 | Mizushima | G11B 7/13 |
| | | | 156/60 |
| 2015/0115060 A1 | 4/2015 | Klemm et al. | |
| 2015/0352241 A1 | 12/2015 | Furner et al. | |
| 2016/0242401 A1* | 8/2016 | Johnston | A01M 1/103 |
| 2020/0147899 A1* | 5/2020 | Royston | B29C 66/72321 |

OTHER PUBLICATIONS

AMVAC Small Insect Strip; EPA Rg. No. 5481-344; 7 pages, May 16, 2013.

AMVAC Small Pro-strip, EPA Reg. No. 5481-553; 10 pages, Aug. 7, 2013.

Alco Small Pest Strip; EPA Reg. No. 5481-348; 7 pages, Mar. 8, 2017.

Hot Shot No-Pest Strip, Controlled Release Technology, 4 pages, downloaded Dec. 4, 2019.

Ortho Home Defense Max No. Pest Insecticide Strip, 2 pages, downloaded Dec. 4, 2019.

Hovex Vaporguard Bin Insect Killer, 1 page, downloaded Dec. 4, 2019.

Fruit Fly Bar Pro FFBP Fruit Fly Strip, 5 pages, downloaded Dec. 4, 2019.

Canadian Examination Report dated Oct. 5, 2023, corresponding to Application No. 3,058,583, 5 pages.

Canadian Examination Search Report dated Jan. 6, 2025, corresponding to Application No. 3,058,583, 5 pages.

* cited by examiner

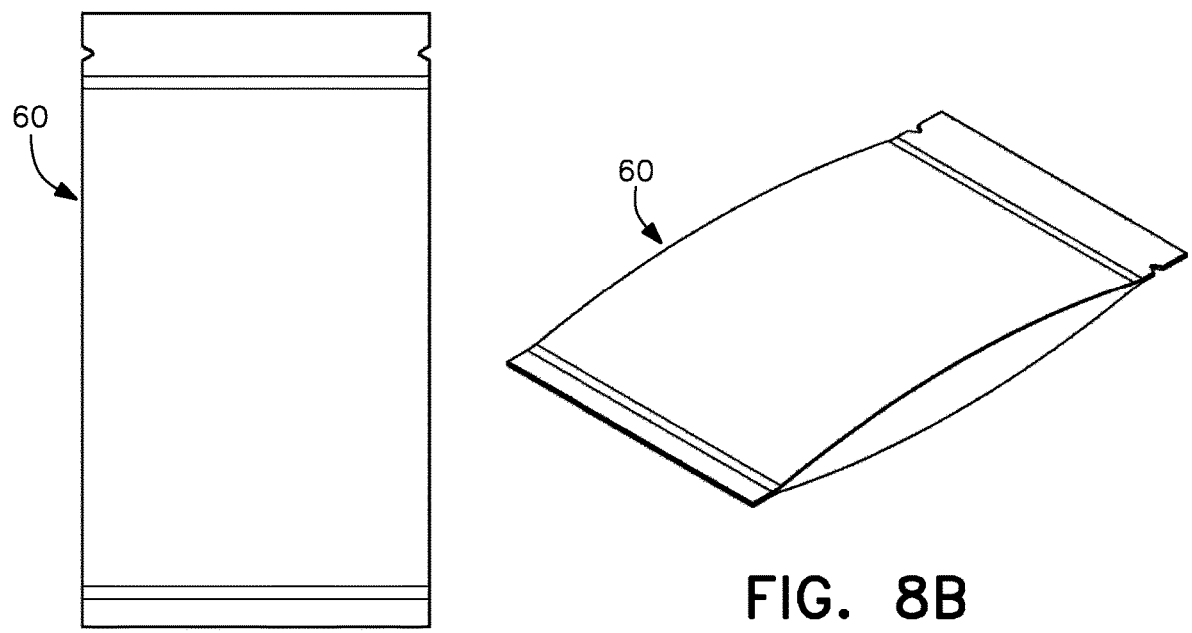
FIG. 8A
FIG. 8B
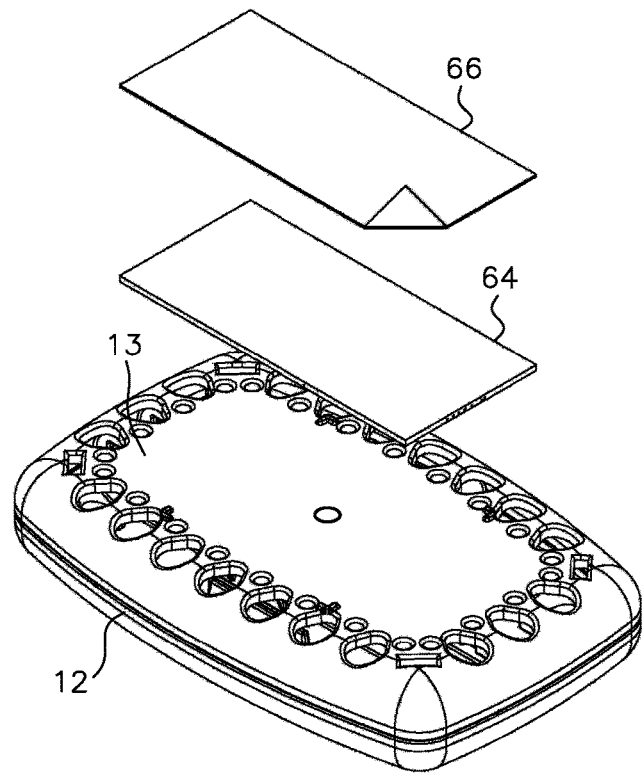
FIG. 9A

INSECT CONTROL DEVICE INCLUDING ALIGNMENT AND SPACING MEMBERS FOR SUPPORTING A SUBSTRATE

CROSS-REFERENCE TO RELATED APPLICATIONS

This application is a continuation of U.S. patent application Ser. No. 16/583,329, filed Sep. 26, 2019, which claims priority to U.S. Provisional Application No. 62/751,154, filed Oct. 26, 2018, the entire disclosures of which are incorporated by reference herein.

FIELD OF THE INVENTION

The present invention is related to the field of pest control and, more particularly, to insect control for household garbage receptacles or other closed trash containers used in outdoor or semi-outdoor environments such as garages and sheds.

BACKGROUND OF THE INVENTION

Garbage receptacles that are kept outdoors or in semi-outdoor environments such as in garages or warehouses are susceptible to insect infestation, particularly if the garbage must be stored in the receptacles Tor an extended length of time. Insect control products for commercial, and professional use in unoccupied areas have been available for many years. These products include Dichlorvos pest strips in various sizes that are enclosed within a plastic cage that is configured to be hung from or stood on a surface within a defined area such as a storage unit, garage, closet, attic, crawl space, and the like. The hanging or standing configuration allows the insect poison to be released through all sides of the plastic cage for effective distribution within an interior or semi-interior space.

However, in smaller spaces such as household garbage receptacles, there is insufficient room to accommodate the hanging or standing pest strips of the type used in storage rooms without compromising the holding capacity of the garbage receptacle. Further, household garbage receptacles such as curbside toters are subject to regular emptying by a third party for example, a garbage collection service by which a hanging or standing pest strip is repeatedly subject to damage and/or loss. One solution has been to attach the hanging strip to the toter handle with a cable tie. However, this can result in an unwanted exterior placement of the pest strip, particularly following trash pickup.

Therefore a need exists for an economical insect control device that is compact, and readily securable within a household-sized outdoor garbage receptacle to effectively kill insects and prevent their proliferation while remaining secure within the garbage receptacle over the effective span of the insect poison contained therein.

SUMMARY OF THE INVENTION

In view of the foregoing, the present invention is directed to an economical insect control device having an outer housing with gas-flow apertures therein, a quantity of gas-releasing insect poisons contained within the housing, and an adhesive attaching element for securing the housing to an inner surface of a covered or lidded household outdoor garbage receptacle. Once the insect control device is secured on the inner surface of the receptacle, the lid of the garbage receptacle is closed to create an enclosed garbage containment area. The gas released by the insect poison flows out of the housing through the gas-flow apertures to permeate the air in the enclosed garbage containment area and kill insects therein, while the adhesive attaching element keeps the device safely secured inside the receptacle where it cannot be accessed by children or pets. The low profile of the outer housing also avoids interfering with the use and emptying of the garbage receptacle.

Accordingly, it is an object of the present invention to provide an insect control device having an insect poison with a gaseous component for killing insects within a closed or lidded household garbage receptacle, such as a garbage can, trash dumpster or trash bin, kept in an outdoor or semi-outdoor environment, the device having an adhesive element for safely securing the device inside the household outdoor garbage receptacle daring both use and emptying thereof.

Another object of the present invention to provide an insect control device in accordance with the preceding object in which the outer housing includes two separable pieces that are coupled together with a snap fit, a threaded engagement and the like, or two pieces conjoined along a common edge by a living hinge, to define an interior space that contains a substrate infused with or otherwise containing the insect poison, the gaseous component thereof being released through the gas-flow apertures and into an enclosed area created by the household garbage receptacle when in use.

Yet another object of the present invention to provide an insect control device in accordance with the preceding object in which the housing has at least one substantially planar outer surface that preferably includes a non-apertured region, the adhesive element being secured to the planar outer surface and used to affix the housing to an inner surface of the closed or lidded household garbage receptacle.

A further object of the present invention is to provide an insect control device in accordance with the preceding objects in which the outer housing contains 5.25 grams of 18.6% Dichlorvos substrate which is sandwiched in an inner space between the two pieces of the housing and supported by spacing and support members formed on the inside surface of each of the two pieces.

A still further object of the present invention is to provide an insect control device in accordance with at least one of the preceding objects in which any of the gaseous poison escaping from the receptacle when the lid is opened will dissipate into the open air of the outdoor or semi-outdoor environment without harming people, animals or plants in the surrounding area.

Yet a further object of the present invention is to provide an insect control device in accordance with the preceding objects in which the spacing and support members include two longitudinal ribs intersected by a transverse rib having an alignment member at each end thereof, the alignment members being generally parallel with the longitudinal ribs and acting as stops to keep the substrate generally centered laterally within the housing.

Another object of the present invention is to provide an insect control device in accordance with the preceding object in which the housing pieces also include longitudinal stops provided at the ends of the longitudinal ribs to generally center the substrate longitudinally within the housing so that when the two housing pieces are snap fit or otherwise secured to one another, the substrate is sandwiched between the spacing and support members of each piece, and bounded on its lateral and longitudinal sides by the alignment members and longitudinal stops, respectively.

Yet another object of the present invention is to provide an insect control device in accordance with the preceding object in which the housing is between about 2 inches to about 4 inches in length and between about 1.5 inches and about 2.0 inches in width, and when mounted has a thickness profile protruding into an interior garbage containing area of the garbage receptacle of only about 0.5 inches or less.

Still another object of the present invention is to provide a method of controlling insects in a closed or lidded household outdoor garbage receptacle by securing an insect control device to an inner surface of the household garbage receptacle using an adhesive element and closing the receptacle, the insect control device including an outer housing with at least one substantially flat side and a plurality of gas-flow apertures therein and having a quantity of gas-releasing insect poison positioned within the housing, a gaseous component of the poison escaping from the outer housing through the gas-flow apertures therein to permeate an enclosed garbage containment area defined by the outdoor household garbage or trash receptacle when in use.

A further object of the present invention is to provide an insect control device in accordance with the preceding objects that is marketed with a substrate strip pre-assembled within an outer housing which is contained within a sealed bag, pouch or other containment layer or enclosure, the consumer removing the pouch or containment layer just prior to use and then securing the adhesive element, embodied as a piece of double-sided adhesive tape, to an outer surface of the housing and to an inner surface of a household garbage can, trash dumpster or trash bin, the device having a low profile that does not interfere with either the placement of garbage into the receptacle or the emptying thereof and the device further being securely kept within the receptacle and out of the reach of children and pets.

Still a further object of the present invention is to provide an insect control device and method in accordance with at least one of the preceding objects in which the gaseous component of the insect poison is released over time to effectively kill flying and crawling insects including flies, gnats, mosquitos, moths, silverfish, cockroaches, spiders, beetles, earwigs, spider mites, and the like, for about four months when the insect control device is placed within a closed household garbage receptacle such as a lidded garbage can, trash dumpster or trash bin.

Yet a further object of the present invention is to provide an insect control device and method in accordance with at least one of the preceding objects that is inexpensive and easy to use for household consumers, can be readily manufactured, and is safe and effective for killing insects and preventing new infestations in an enclosed space while preventing access to the insecticide by children and pets when used as directed.

These and other objects of the invention, as well as many of the intended advantages thereof, will become more readily apparent when reference is made to the following description taken in conjunction with the accompanying drawings.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 8A is a planar view of a pouch for enclosing at least the gas-releasing poison substrate used within the device according to the present invention.

FIG. 8B is a perspective view of the pouch shown in FIG. 8A.

FIG. 9A is an exploded view of the outer housing, an adhesive coating to be applied directly to the outer surface of the housing and a release liner to cover the adhesive coating of an insect control device according to an alternate adhesive element configuration of the present invention.

DETAILED DESCRIPTION OF THE INVENTION

Figure 1:
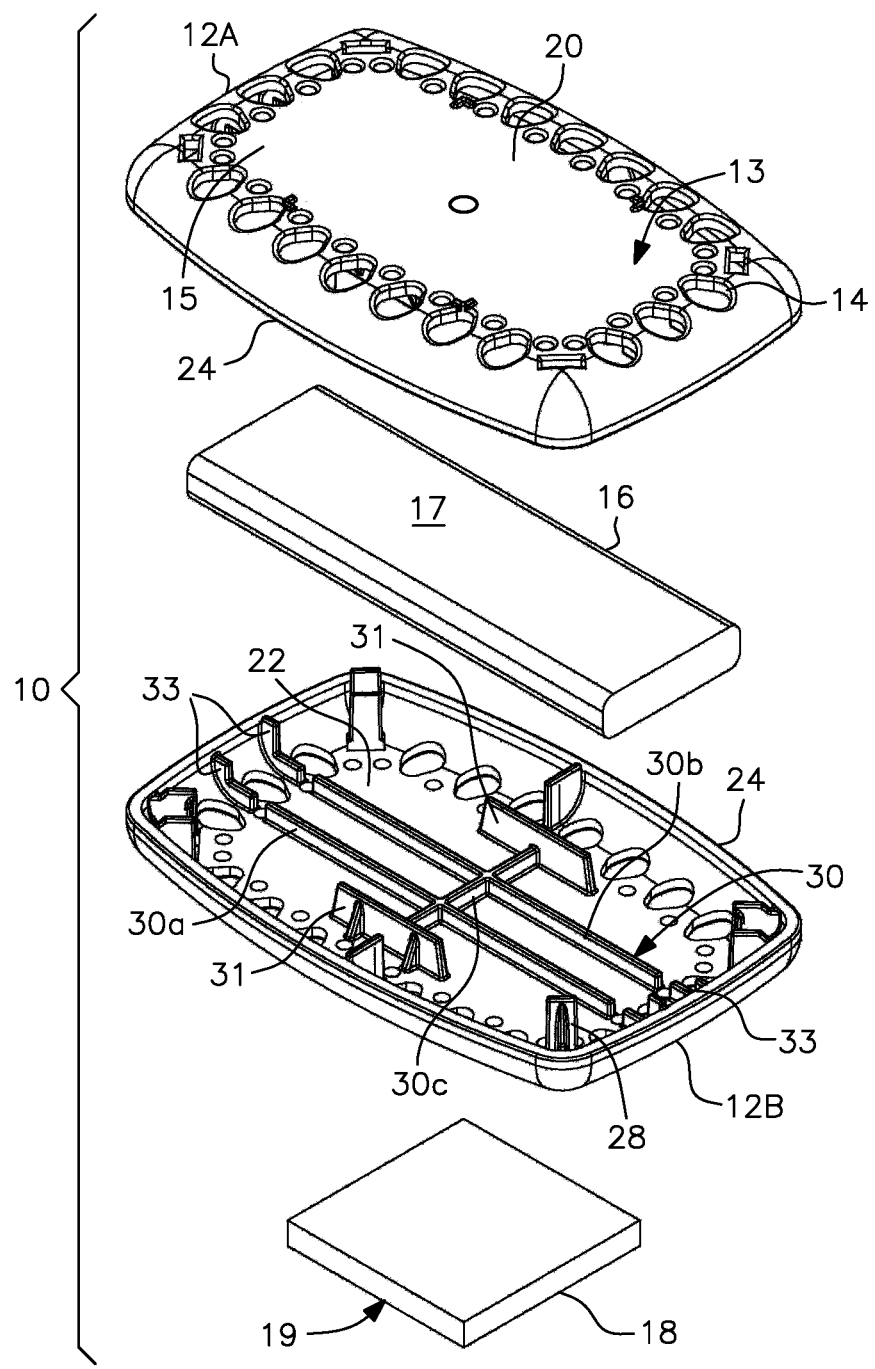
FIG. 1 is an exploded top perspective view of the components of an insect control device in accordance with the present invention.
Figure 2:
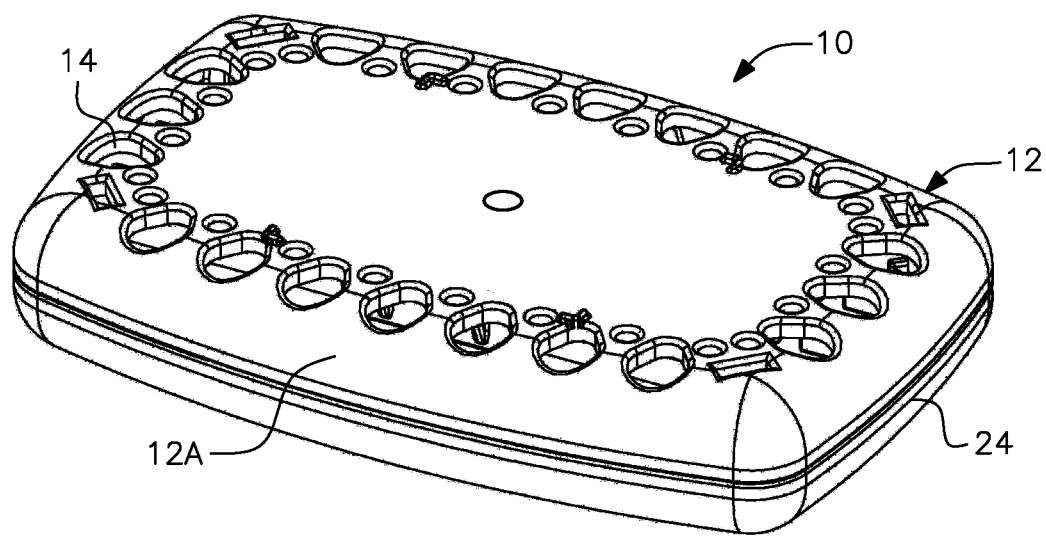
FIG. 2 is an assembled top perspective view of the insect control device shown in FIG. 1.
Figure 3:
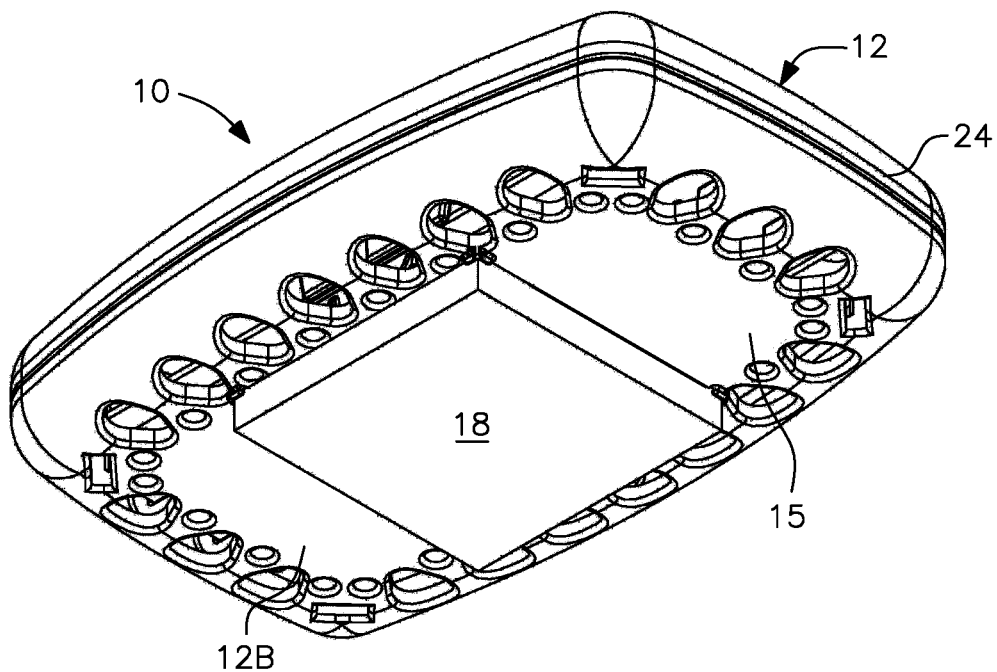
FIG. 3 is a bottom perspective view of the assembled insect control device shown in FIG. 2.
Figure 4:
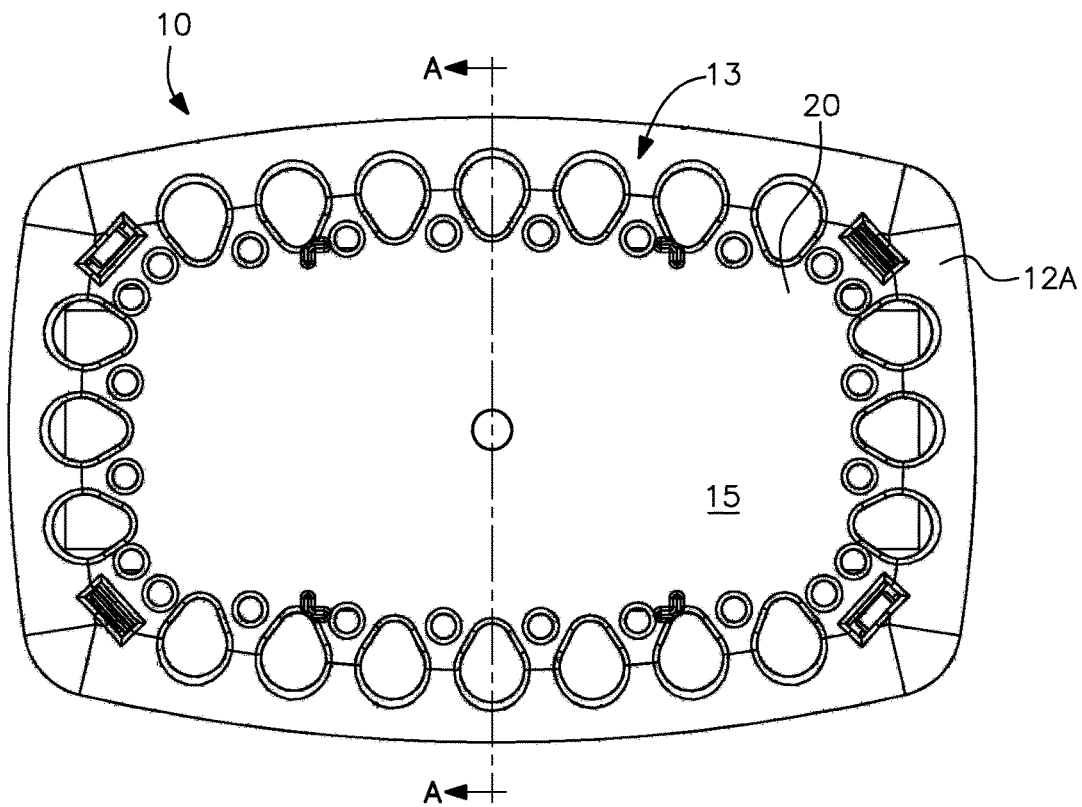
FIG. 4 is a top planar view of the insect control device as shown in FIG. 2.
Figure 5:
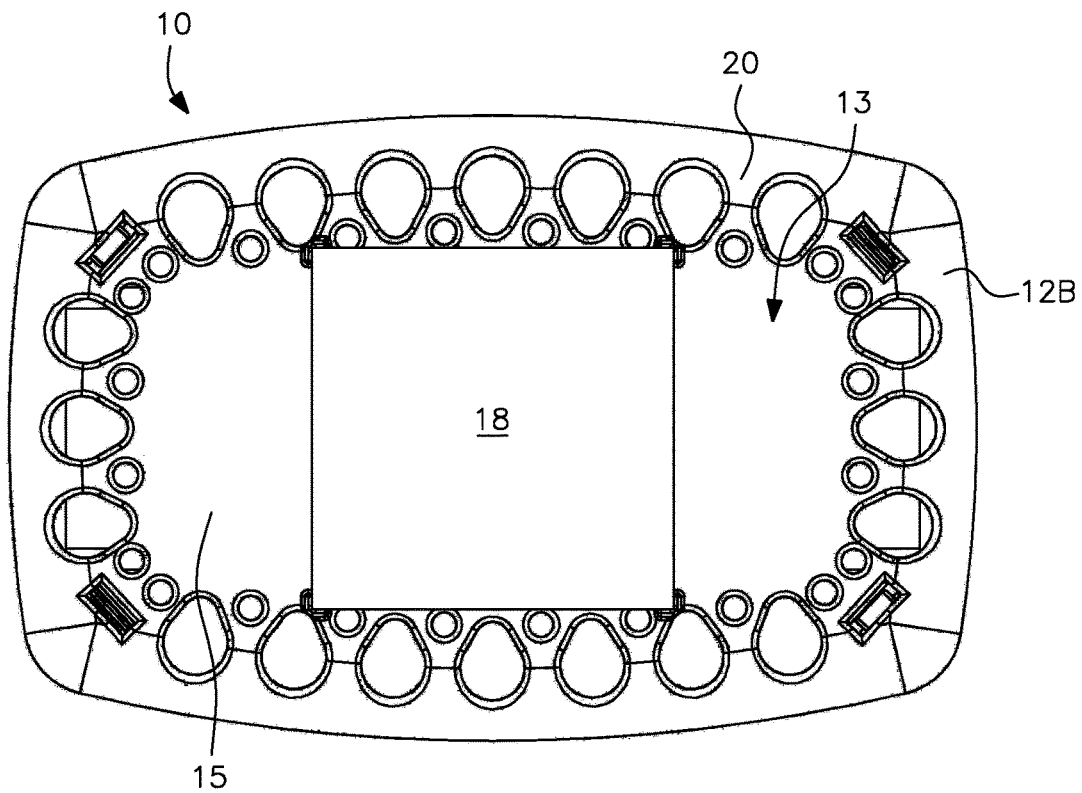
FIG. 5 is a bottom planar view of the insect control device as shown in FIG. 3.
Figure 6:
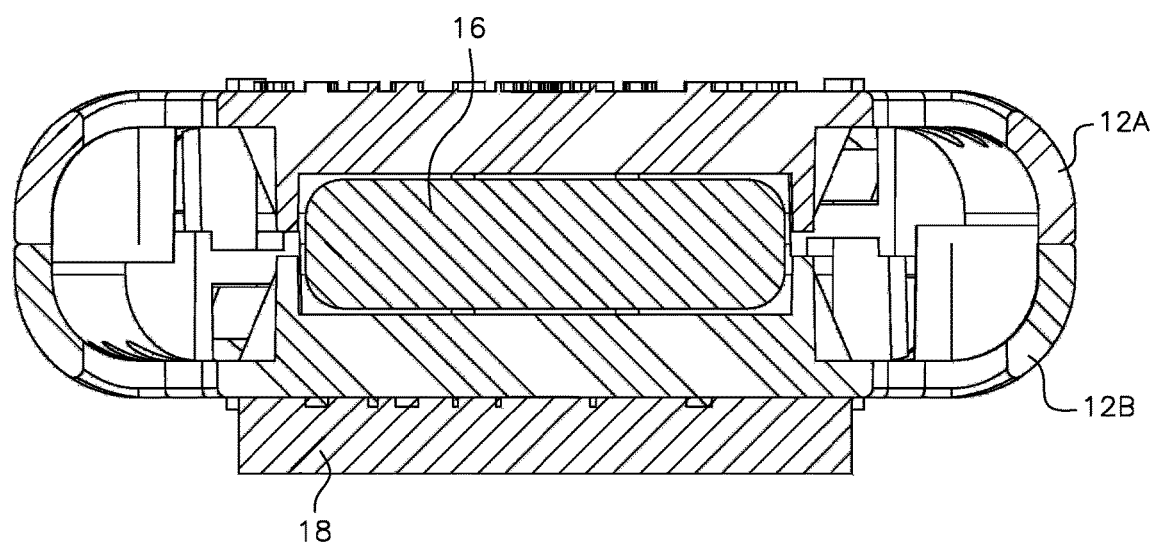
FIG. 6 is a cross sectional view taken along line A-A of FIG. 4.

In describing preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

As shown in FIGS. 1-6, the present invention is directed to an insect control device generally designated by reference numeral 10. The insect control device 10 includes an outer housing generally designated by reference numeral 12 having a plurality of gas-flow apertures 14 therein. The outer housing has at least one substantially planar outer surface generally designated by reference numeral 13 that preferably includes a non-apertured region 15. A quantity of gas-releasing insect poison 16, as embodied in a brick-like solid substrate containing an insect poison that releases a gaseous component in use, is contained within the housing 12. An attaching element generally designated by reference numeral 19, here embodied as an adhesive element 18, is configured to be secured to the non-apertured region 15 of the housing outer surface 13. While not essential, having a non-apertured region 15 provides full surface contact area between the housing and the adhesive element and is therefore preferred.

According to a preferred embodiment, the active ingredient in the poison held within the substrate is Dichlorvos (2,2-dichlorovinyl dimethyl phosphate), which is preferably 18.6% of the composition, with the substrate weighing 5.25 grams. The vapor is released from the housing by volatilization and is odorless while being effective to deeply penetrate the surrounding area. Dichlorvos substrates that are suitable for use with the present invention are commercially available from various vendors. The present invention is also intended to include embodiments that utilize other active ingredients for insect control that are now available or that will be available in the future such as, for example, Transfluthrin, registered in the U.S. to Bayer Chemical Company.

According to a preferred embodiment, the outer housing is comprised of two interchangeable pieces 12A, 12B, preferably of molded plastic. Each piece has an outer surface 20 having the substantially planar outer surface 13 and non-apertured region 15, an inner surface 22 and adjoining edges 24. The edges 24 are formed to enable the two pieces 12A, 12B to be fastened together, preferably with a snap fit, to define an inner space 26 (see FIG. 6). Alternatively, the two pieces may be joined to one another along a common edge as by a living hinge and snap-fit on the opposing side. The two pieces could also be threadedly engaged, such as with a disc-shaped outer, housing having upper and lower parts that are screwed together to define the interior or inner space 26.

The gas-releasing poison substrate 16 is positioned within the inner space 26, as covered by the housing 12, while the gas-flow apertures 14 allow gas released by the insect poison to flow out of the housing. The gas-releasing poison substrate 16 is preferably embodied as a strip 17 infused with poison that is released by volatilization. The non-apertured region 15 of the outer surface 13 provides a stable mounting surface for the adhesive element 13 which is used to secure the device to an inner surface of a household garbage receptacle 44 (see FIGS. 7C, 7D and 7F).

In the embodiment shown in FIGS. 1-6, the inner surface 22 of the housing pieces 12A, 12B includes structural members 28 to add rigidity to the housing as well as spacing and support members generally designated by reference numeral 30 to stiffen the housing and allow for air flow between the poison substrate 16 and the housing inner surface 22. The spacing and support members 30 preferably include two longitudinal ribs 30a, 30b intersected by a transverse rib 30c. Two alignment members 31 are also provided, one at each end of the transverse rib 30c. The alignment members 31 are generally parallel with the longitudinal ribs 30a, 30b and act as stops to keep the substrate strip 17 centered laterally within the housing. Longitudinal stops 33 may also be provided at the ends of the longitudinal ribs to center the substrate strip 17 longitudinally within the housing. When the two housing pieces 12A, 12B are secured to one another, the substrate strip 17 is thus kept in a generally centered position, sandwiched between the spacing and support members 30 of each piece, and bounded on its lateral and longitudinal sides by the alignment members 31 and longitudinal stops 33, respectively.

The length of the housing is preferably between about 2 inches to about 4 inches, and more preferably is about 2.625 inches. The width of the housing is preferably between about 1.5 inches to about 2.0 inches, and more preferably is 1.75 inches. As assembled, the thickness of the housing from top to bottom is preferably no more than about 0.5 inches such that the device, when adhered to an inner surface of the garbage receptacle protrudes only about 0.5 inches into the garbage holding area. As used herein in connection with the dimensions of the housing, "about" is intended to refer to the stated value plus or minus 0.25 inches.

When marketed, the housing and substrate strip 17 are preferably preassembled, with the substrate strip already contained within the inner space of the housing which is enclosed within a sealed bag, pouch or other containment layer or enclosure for distribution to the consumer. Planar and perspective views of a representative pouch, generally designated by reference numeral 60, are shown in FIGS. 8A and 8B. Just prior to use, the user removes the housing, with the strip inside, from the containment layer and applies the adhesive element 18, which may be embodied as a piece of double-sided adhesive tape provided as a separate component included with the housing, to one of the planar outer surfaces 13 of the housing. The device is then positioned within a garbage can, trash dumpster or trash bin and adhered to an inner surface of the receptacle by the other side of the adhesive element. Once secured inside, the device is out of the reach of children and pets while the low profile of the device does not interfere with either the placement of garbage into the receptacle or the emptying thereof.

Figure 7A:
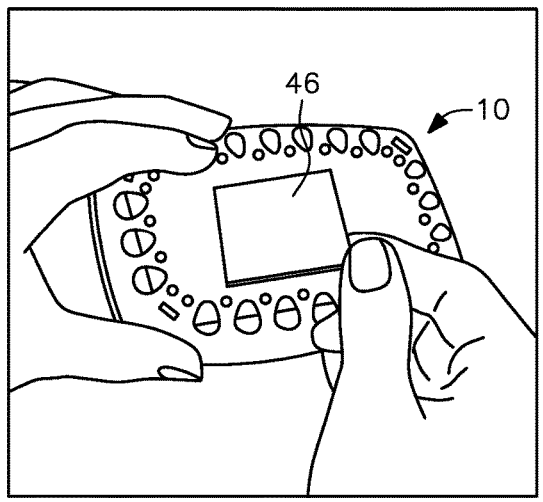
FIGS. 7A-7D show the steps taken by the user to uncover the adhesive and apply the insect control device to an inner surface of a lidded household garbage receptacle.
Figure 7B:
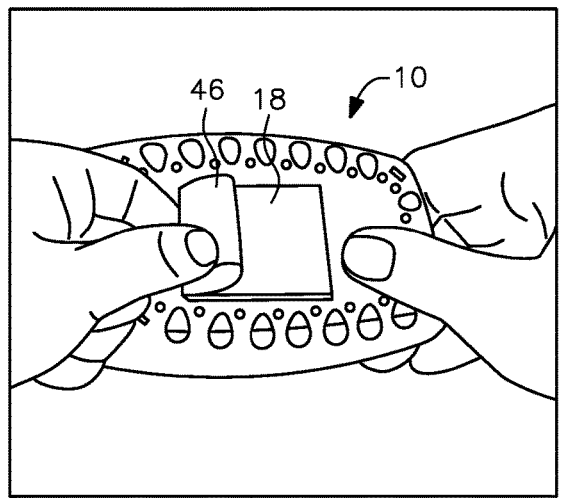
Figure 7C:
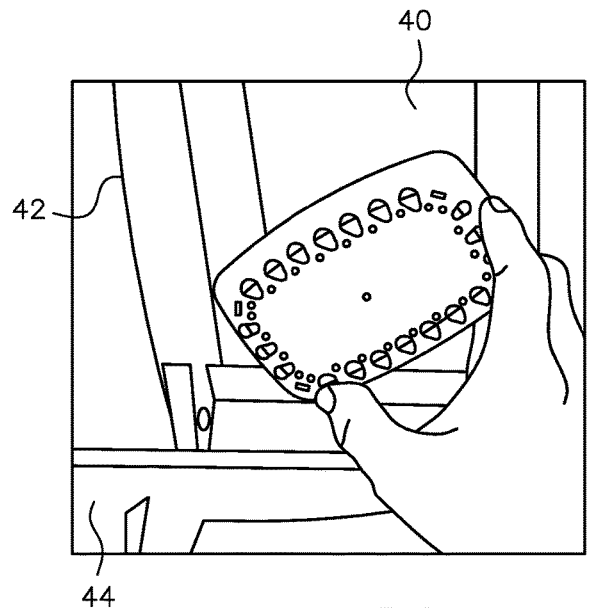
Figure 7D:
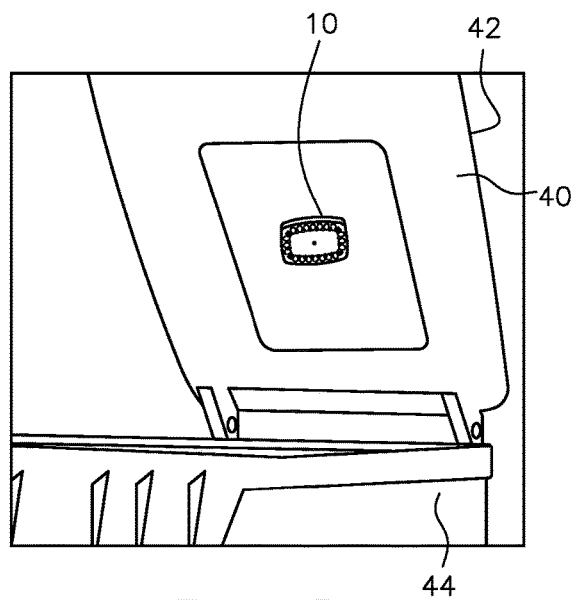
Figure 7E:
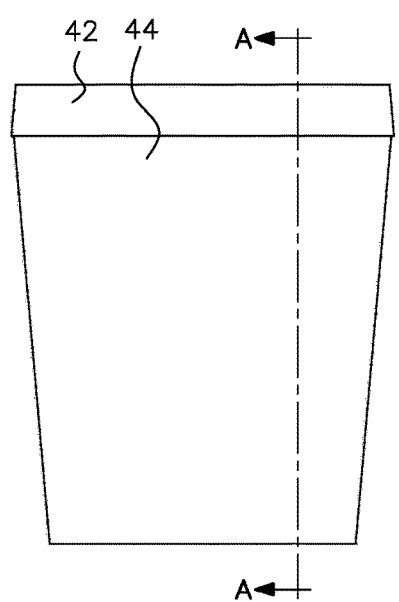
FIG. 7E is a side view of the household garbage receptacle shown in FIGS. 7C and 7D in which the insect control device has been secured and with the lid closed for use.
Figure 7F:
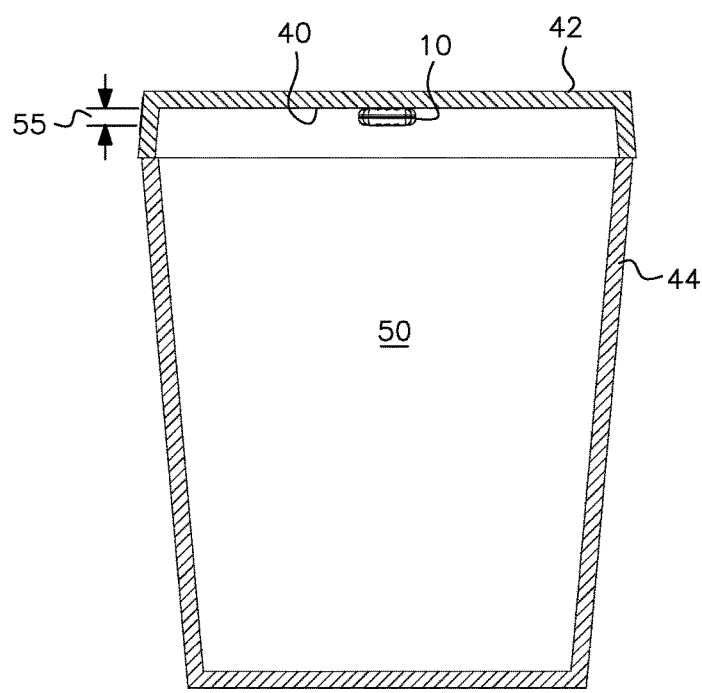
FIG. 7F is a cross-sectional view taken along line A-A of FIG. 7E.

FIGS. 7A-7D show the steps taken by the user to apply the insect control device to an inner surface of a lidded household garbage receptacle which is then closed for use as shown in FIG. 7E and in the section view of FIG. 7F. While the insect control device 10 may be placed on any inner surface of the receptacle, in the embodiment shown the device 10 is secured to the inside surface 40 of the lid 42 of the garbage receptacle 44 using the adhesive 18.

As shown in FIG. 7A, the adhesive 18 is preferably a piece of double-sided adhesive tape covered with a release layer 46 on each side which, as shown in FIG. 7B, are removed prior to 1) adhering the tape to the device and then 2) applying the device to the lid using the other side of the adhesive tape. When both layers 46 have been removed, FIG. 7C, and the insect control device adhesively secured to the inside surface 40 of the lid 42 of the garbage receptacle 44, FIG. 7D, the lid 42 is thereafter closed, FIGS. 7E and 7F, to define an enclosed garbage containment area 50. The gas released from the insect poison 16 passes through the apertures 14 and permeates the air within the enclosed garbage containment area 50, killing the insects therein and preventing further infestations. Further, the adhesive element 18 keeps the device held securely in place within the garbage receptacle during both use and emptying thereof, while a thickness profile 55 of the device (see FIG. 7F) is about 0.5 inches or less. As used in connection with the thickness profile, "about" in intended to refer to the stated value plus or minus 0.25 inches.

Figure 9B:
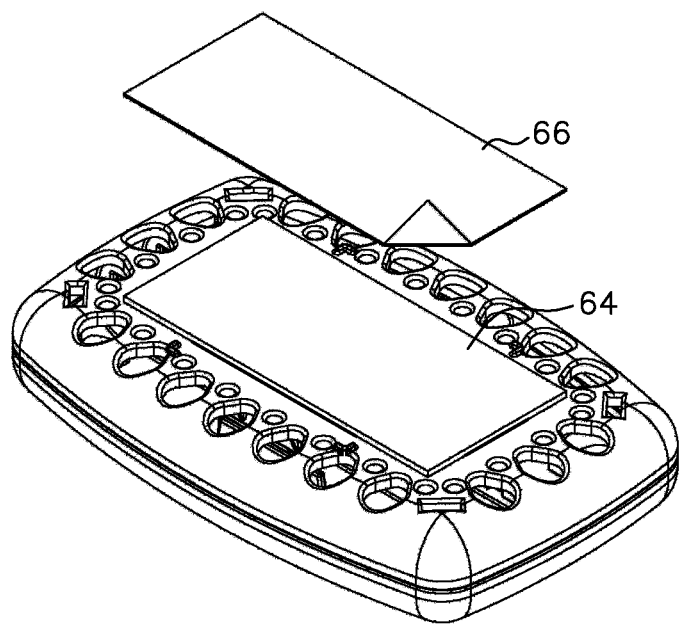
FIG. 9B is a partially assembled view of the components shown in FIG. 9A, the adhesive coating having been applied to the housing.
Figure 9C:
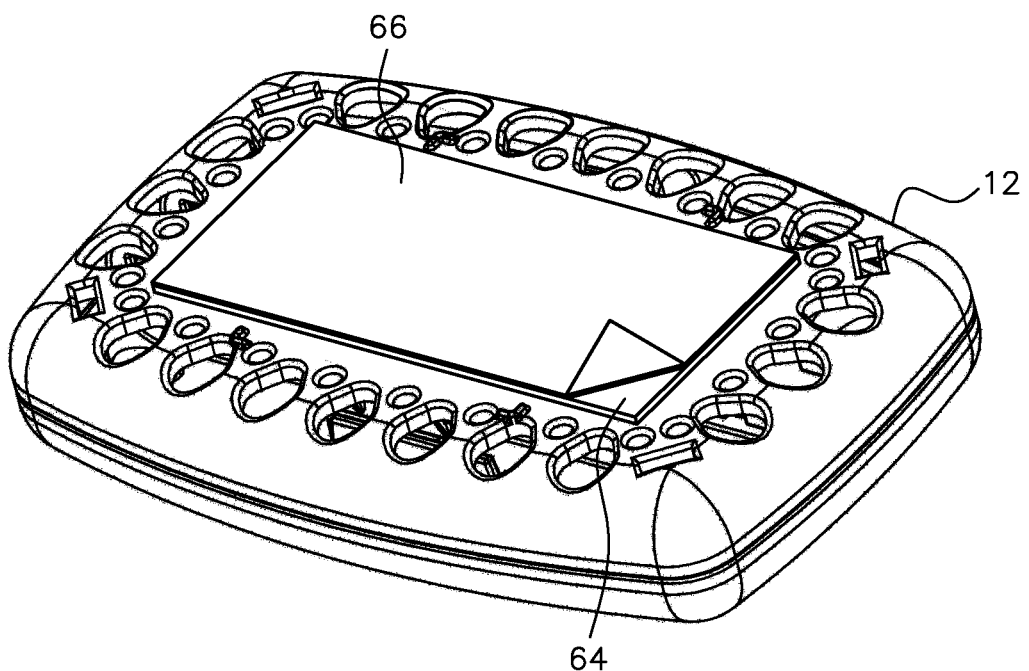
FIG. 9C is a fully assembled view of the components shown in FIG. 9A.
Figure 10A:
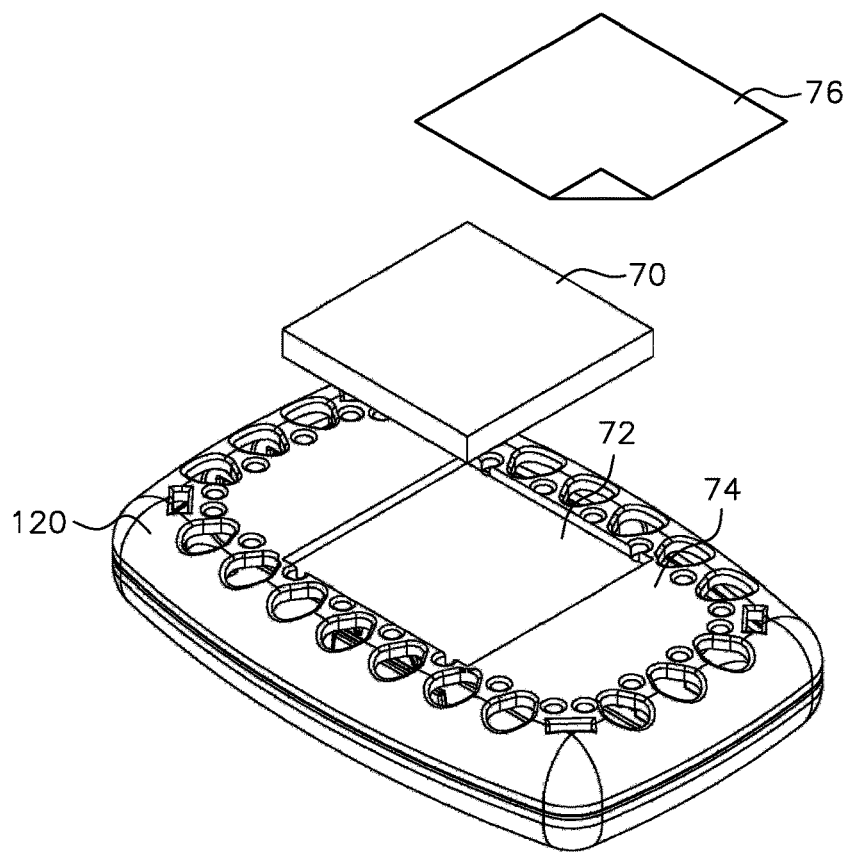
FIG. 10A is an exploded view of the components of another adhesive element configuration for an insect control device according to the present invention, the device including an outer housing having a recessed pocket to receive an adhesive element which is covered by a release liner.
Figure 10B:
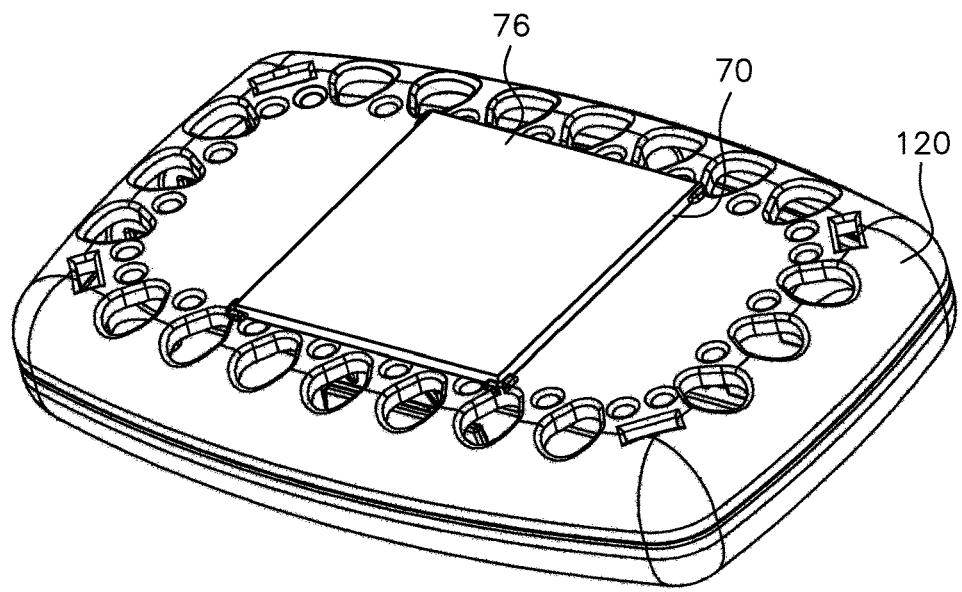
FIG. 10B is an assembled view of the components shown in FIG. 10A in which the adhesive element, when applied, protrudes to a limited degree from the recess.

Adhesive configurations other than double-sided adhesive tape may also be used in accordance with the present invention. These configurations include, but are not limited to, an adhesive coating 64 applied directly to the flat exterior surface 13 of the outer housing 12 and covered with a release liner 66 as shown in FIGS. 9A-9C, or art adhesive member 70 embedded in a recess 72 in an exterior surface 74 of the outer housing 120 as shown in FIG. 10A. When secured to the outer housing, the adhesive member 70 may be flush with the outer surface thereof in like manner as shown in FIG. 9C or may protrude slightly above the flat outer surface as shown in FIG. 10B. The outer surface of the adhesive member 70 is covered with a release liner 76. In each of these adhesive configurations, the consumer need only remove the release liner to expose the adhesive area on the exterior surface of the outer housing and apply the device to the inner surface of the trash receptacle for use.

While not the preferred embodiment, the insect control device according to the present invention may be packaged for distribution to the consumer with just the substrate strip contained within the pouch. Prior to use the user would then remove the strip from the pouch, place the strip within the housing and secure the housing pieces to one another to form a closed configuration containing the unwrapped strip. If not already attached to or coated on the housing, the adhesive element is then secured to the housing and the device positioned within a garbage can, trash dumpster or trash bin and adhered to an inner surface of the receptacle.

As described herein, the insect control device according to the present invention works effectively to kill insects within a closed or lidded household garbage receptacle, such as a garbage can, trash dumpster, trash bin, and the like, that is kept in an outdoor or semi-outdoor environment by permeating the air within the receptacle. The poison is typically held within a substrate enclosed within the housing that is infused with, or otherwise contains, the insect poison. Prior to use, the substrate (or the substrate as pre-assembled within the housing) is kept within a sealed outer pouch made of plastic, foil, or the like. Once the sealed outer pouch is removed and with the strip being secured within the housing, the apertures in the housing allow the gaseous fumes released from the substrate to pass into the enclosed garbage containment area in which the device has been placed. Because the device is adhesively secured inside the receptacle there is no risk of direct exposure to animals, children or plants that may be near the garbage container. Upon opening of the lid, any gases escaping from the receptacle will dissipate into the open air of the outdoor or semi-outdoor environment without harming people, animals or plants in the surrounding area. As a result, the insect control device is easy to use while being safe and effective for controlling insects when used as directed.

In use and according to the preferred embodiment, the device housing and substrate are marketed in a pre-assembled configuration with a containment layer wrapped around the assembly such that the housing does not need to be opened by the consumer. In this configuration, the adhesive element may be part of the assembly, such as coated onto the planar surface or already secured to one side of the outer housing as shown in FIGS. 9C and 10B with a single release liner on the outer side, for attaching the device to the garbage receptacle. Alternatively, the adhesive element may be separate and mounted to the housing by the consumer after removal of the assembly from the outer containment layer.

The present invention is also directed to a method of controlling insects in an outdoor garbage receptacle having a lid or other closed container. The method includes adhering the insect control device to an inner surface of the garbage receptacle, which may be a garbage can, trash dumpster, trash bin and the like, with the insect control device including an outer housing having at least one gas-flow aperture therein and a quantity of gas releasing insect poison positioned within the housing. Once secured, the method includes closing the lid, or otherwise closing the trash container, for use. While in use, a gaseous component of the poison escapes from the outer, housing through the at least one gas-flow aperture therein to permeate an enclosed garbage containment area defined by the outdoor garbage receptacle or other container. The low profile of the device does not interfere with the garbage containing volume of the garbage receptacle, and securing of the device to the inner surface of the receptacle by adhesive prevents inadvertent contact by animals, children or plants that may be in the area around the receptacle.

According to a preferred embodiment, the gaseous component of the insect poison in the insect control device is released over time to effectively kill flying and crawling insects including flies, gnats, mosquitos, moths, silverfish, cockroaches, spiders, beetles, earwigs, spider mites, and the like. According to the preferred embodiment, the insect control device includes a quantity of poison-infused substrate, such as 18.6% Dichlorvos, that weighs about 5.25 grams, which will treat 50 cu. ft. of enclosed space for about four months when the insect control device is placed within a closed household garbage can, trash dumpster or trash bin. For larger enclosed areas, multiple insect control devices may be placed within the trash or garbage container.

The foregoing descriptions and drawings should be considered as illustrative only of the principles of the invention. The invention may be configured in a variety of shapes and sizes and is not limited by the dimensions of the preferred embodiment. Therefore, it is not desired to limit the invention to the specific examples disclosed or the exact construction and operation shown and described. Rather, all suitable modifications and equivalents may be resorted to, falling within the scope of the invention.

What is claimed is:

1. An insect control device, comprising:
    a housing defining an interior space, including:
        a plurality of gas-flow apertures formed through the housing and in communication with the interior space;
        a plurality of spacing and support members defining support surfaces that project into the interior space and adapted to support a substrate within the interior space, the the spacing and support members include a longitudinal rib extending in a longitudinal direction of the housing, the longitudinal rib intersected by a transverse rib intermediately along its length; and
        a pair of alignment members distinct from the spacing and support members, the alignment members arranged on opposite sides of the interior space, and sized and located to support the substrate in a lateral direction of the housing within the housing.

2. The insect control device as set forth in claim 1, wherein the spacing and support members project from an interior surface of the housing and into the interior space and support the substrate continuously along their length at a distance from the interior surface.

3. The insect control device as set forth in claim 1, wherein the alignment members center the substrate in the lateral direction within the housing.

4. The insect control device as set forth in claim 1, wherein each alignment member defines a planar face oriented perpendicularly relative to the support surfaces of the spacing and support members.

5. The insect control device as set forth in claim 1, further comprising a pair of longitudinal stops distinct from the spacing and support members, each of the longitudinal stops arranged proximate a respective end of the housing for positioning the substrate longitudinally in the longitudinal direction within the housing and defining a first support surface oriented perpendicularly relative to the support surfaces of the spacing and support members.

6. The insect control device as set forth in claim 5, wherein each longitudinal stop is arranged adjacent to and separated from a respective one of first and second ends of the longitudinal rib.

7. The insect control device as set forth in claim 5, wherein each of the pair of alignment members is arranged at a respective end of the transverse rib.

8. The insect control device as set forth in claim 5, wherein each longitudinal stop further defines a second support surface oriented parallel with the support surfaces of the spacing and support members.

9. The insect control device as set forth in claim 1, wherein the housing comprises two pieces that fasten to one another to define the interior space, each piece having a plurality of the gas-flow apertures and the spacing and support members.

10. The insect control device as set forth in claim 1, further comprising a substrate infused with gas-releasing insect poison positioned within the housing interior space, the substrate defining opposite exterior surfaces oriented parallel to and abutting the support surfaces of the spacing and support members along their length with the substrate sandwiched between the spacing and support members, a gaseous component of the poison escaping from the outer housing through the plurality of gas-flow apertures therein when the device is in use.

11. The insect control device as set forth in claim 1, further comprising a substrate infused with gas-releasing insect poison positioned within the housing and supported on the support surfaces, the substrate being pre-assembled within the housing and surrounded by a sealed gas containment enclosure during storage and prior to use, a gaseous component of the poison escaping from the housing through the at least one gas-flow aperture therein after the gas containment enclosure is removed for use of the device.

12. An insect control device, comprising:
a housing defining an interior space, including:
a plurality of gas-flow apertures formed through the housing and in communication with the interior space;
a plurality of spacing and support members defining support surfaces that project into the interior space and adapted to support a substrate within the housing interior space;
an adhesive attachment locating projection extending from an exterior surface of the housing and adapted to locate an adhesive attachment element on the exterior surface;
an adhesive attaching element arranged on the exterior surface of the housing, an exposed portion of the adhesive attaching element extends above the adhesive attachment locating projection in a direction away from the exterior surface of the housing.

13. The insect control device as set forth in claim 12, wherein the adhesive attachment locating projection delineates a position of the adhesive attachment element on the exterior surface.

14. The insect control device as set forth in claim 13, wherein the position is located centrally on the exterior surface of the housing.

15. The insect control device as set forth in claim 12, wherein the adhesive attachment locating projection opposes at least two exterior faces of the adhesive attachment element.

16. The insect control device as set forth in claim 12, wherein the adhesive attachment locating projection includes at least two locating projections, each locating projection defining a first locating surface extending in a first direction and a second locating surface extending in a second direction perpendicular to the first direction.

17. The insect control device as set forth in claim 12, further comprising a substrate infused with gas-releasing insect poison positioned within the housing, the substrate being pre-assembled within the housing and surrounded by a sealed gas containment enclosure during storage and prior to use, a gaseous component of the poison escaping from the housing through the at least one gas-flow aperture therein after the gas containment enclosure is removed for use of the device.

18. An insect control device, comprising:
a housing defining an interior space, including:
a plurality of gas-flow apertures formed through the housing and in communication with the interior space;
a plurality of spacing and support members defining support surfaces that project into the interior space and adapted to support a substrate within the interior space, the the spacing and support members include a longitudinal rib extending in a longitudinal direction of the housing, the longitudinal rib defining a first one of the support surfaces intermediately along its length; and
a pair of alignment members distinct from the spacing and support members, the alignment members arranged on opposite sides of the interior space, and sized and located to support the substrate in a lateral direction of the housing within the housing; and
a substrate infused with gas-releasing poison contactingly supported on the first one of the support surfaces intermediately along the length of the longitudinal rib.

* * * * *